United States Patent [19]

Dornen et al.

[11] 3,883,840

[45] May 13, 1975

[54] ADJUSTABLE SPINDLE-TYPE RESISTOR ELEMENT

[75] Inventors: Peter Dornen, Riemerling; Martin Hindermayr, Aying; Ferdinand Wagner, Munich, all of Germany

[73] Assignee: Firma Wilhelm Ruf OHG, Hohenkirchen, Germany

[22] Filed: Oct. 17, 1973

[21] Appl. No.: 407,145

[30] Foreign Application Priority Data

Oct. 18, 1972 Germany .............................. 723818

[52] U.S. Cl. ................. 338/128; 338/161; 338/180

[51] Int. Cl. ............................................... H01c 9/02

[58] Field of Search ........... 338/180, 181, 118, 160, 338/176, 128, 68, 161, 184, 196, 199, 178, 131, 133

[56] References Cited

UNITED STATES PATENTS

| | | | |
|---|---|---|---|
| 2,506,482 | 5/1950 | Batchellea | 338/178 |
| 2,926,324 | 2/1960 | Bauden et al. | 338/180 |
| 3,124,780 | 3/1964 | Hulbert | 338/184 X |
| 3,585,560 | 6/1971 | Schlesier | 338/131 |
| 3,624,582 | 11/1971 | Iwasaki | 338/196 X |
| 3,634,805 | 1/1972 | Jestrzemski et al. | 338/180 |

*Primary Examiner*—Bruce A. Reynolds
*Attorney, Agent, or Firm*—Joseph A. Geiger

[57] ABSTRACT

Adjustable spindle-type resistor element with a slide track on a printed circuit board, a spindle journalled inside vertical panels of the sheet metal housing, the vertical panels including twist spikes and soldering lugs for mounting and connecting purposes. A slit finger on the slider block of the resistor element engages a guide slot in the housing.

8 Claims, 4 Drawing Figures

ADJUSTABLE SPINDLE-TYPE RESISTOR ELEMENT

BACKGROUND OF THE INVENTION

1. Field of the Invention

The present invention relates to adjustable resistor elements, and in particular to adjustable spindle-type resistor elements which are suitable for mounting on printed circuit boards and the like, especially when arranged in the form of a tuning register composed of several parallel aligned resistors.

2. Description of the Prior Art

This type of resistor element receives preference in applications where requirements of high definition and adjustment accuracy have to be met. Apart from the field of professional equipment electronics, which is the major user of spindle-type resistors, such elements are nowadays also being used in increasing amounts in the electronics of wireless transmission, especially television. With the introduction of individual station tuning by means of capacitor diodes, spindle-type resistors have come to be used as potentiometers for the control potential of the diodes, and especially as a means for the individual pretuning of a number of stations which can than be selected by means of a tuning register.

Among the various known prior art spindle-type resistor elements are those which have a slide track arranged in parallel to the spindle axis and those which do not have a separate slide track, but where the metallic spindle itself serves as a collector element. In most cases these spindle-type resistors have a trough-shaped housing of plastic material. Also known are a variety of assemblies of several spindle-type resistor elements in a common compartmentalized housing serving as multi-resistor elements, as well as combinations which include switches and pushbuttons, as for example, pushbutton tuning registers. Such a tuning resistor is disclosed, for example, in the German Pat. No. 1,917,678.

Resistor elements having only one spindle are normally so designed that they satisfy the stringent mechanical and electronic specifications set for professional electronics equipment. For this reason they are in most cases too expensive for use in consumer electronics applications, such as television sets.

Multi-spindle resistor elements, on the other hand, have the disadvantage that their number of resistor elements is predetermined, and that a change in the number of elements in the assembly is not possible. Pushbutton tuning registers, therefore, have not only the shortcoming of a fixed number of spindle-type resistor elements, but they are also unsuitable for all those applications, where the memory unit with the tuning resistors has to be located at a different place from the tuning selector unit (e.g. electronic program selector switch).

SUMMARY OF THE INVENTION

Underlying the present invention is therefore the objective to create a spindle-type resistor element of a simple low cost design which is suitable for general use and which can be mounted quickly and conveniently on a printed circuit board.

The present invention proposes to attain the above objective by suggesting a spindle-type resistor element having a sheet metal housing which is reinforced in its mid-portion and which includes vertical support panels at both ends with panel extensions in the form twist spikes. The adjustment spindle is journalled in these support panels, and the slider block which is carried by the spindle has a guide finger received in a longitudinal slot in the housing. The longitudinal slot is formed by outwardly flared wall portions which also serve to improve the bending stiffness of the resistor housing.

Another advantageous feature of the invention suggests that the guide finger of the slider block be provided with a central slit, in order to obtain a resilient, clearance-free engagement between the finger and the longitudinal guidle slot of the housing.

It is further suggested, according to the invention, to provide terminal means at the lower ends of the twist spikes, the latter being, for instance, in the form of soldering lugs.

The preferred embodiment of the invention has a particularly advantageous structure inasmuch as the basic parts of the spindle-type resistor element, consisting of the sheet metal housing, the adjusting spindle, the spindle knob, the slider block, and the slider arm, can be preassembled on a production basis. These preassembled resitor elements can then be conveniently and quickly mounted on a variety of printed circuit boards, where only the slide track in the form of a resistive layer on the circuit board is required. These advantages not only reflect themselves favorably in terms of economies of production, they also simplify parts management and final assembly, without unnecessarily limiting its versatility of application. Inasmuch as the printed circuit board itself carries the slide track, it can further be said that one mechanical element of the spindletype resistor assembly has been saved.

BRIEF DESCRIPTION OF THE DRAWING

Further special features and advantages of the invention will become apparent from the description following below, when taken together with the accompanying drawing which illustrates, by way of example, a preferred embodiment of the invention, represented in the various figures as follows.

DESCRIPTION OF THE PREFERRED EMBODIMENT

Figure 1:
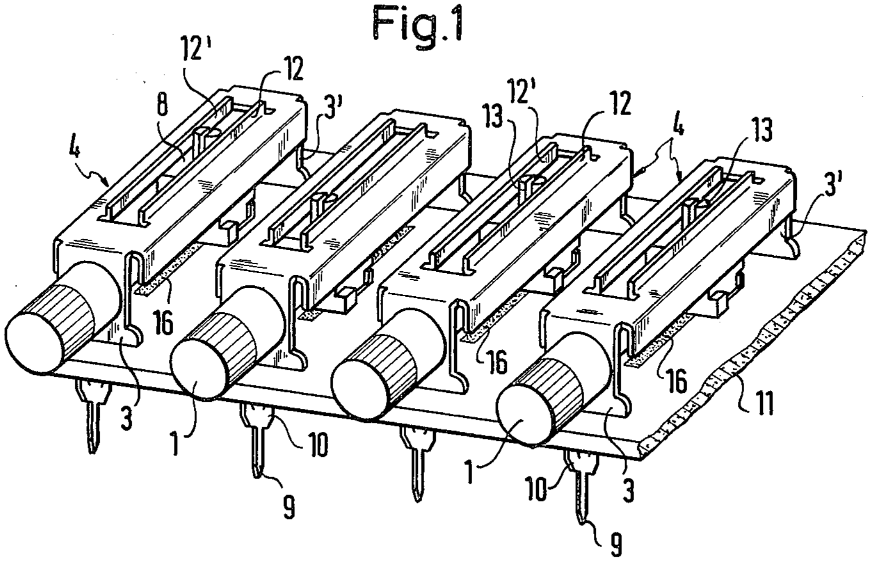
FIG. 1 is a perspective view of a group of spindle-type resistor elements embodying the invention.
Figure 2:
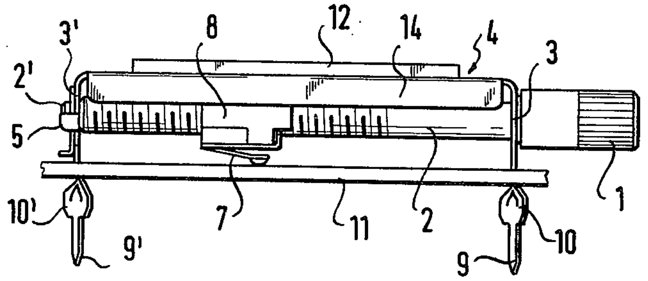
FIG. 2 shows one of the resistor elements in an elevational view, as mounted on a printed circuit board.
Figure 4:
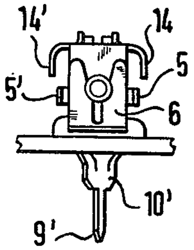
FIG. 4 is a side view of the resistor of FIG. 2.
Figure 3:
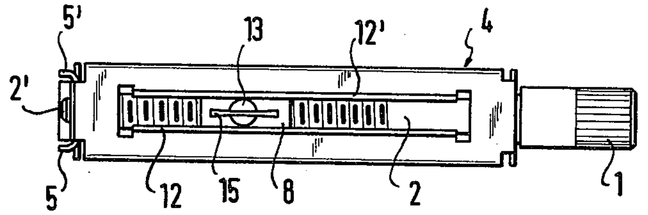
FIG. 3 is a plan view of the resistor of FIG. 2.

As can be seen in FIG. 2, the resistor element of the invention includes a spindle 2, one end of it carrying a plastic knob 1 by means of which it can be rotated. A housing 4 (FIG. 3) of sheet metal extends over the length of the spindle and includes at its two longitudinal ends vertical panels 3 and 3' inside which the spindle is journalled. The axial positioning of the spindle relative to the housing is provided at the far end of the spindle, where the latter has a shoulder at the inside of the vertical panel 3' which cooperates with a retaining clip 6 seated in a groove of the spindle portion at the outside of the vertical panel 3'.

On its threaded portion the spindle 2 carries a threaded slider block 8 which moves longitudinally along the spindle when the knob 1 is rotated. The two vertical end panels 3 and 3' also provide the mounting connection between the unit and a printed circuit board, each end panel having a pair of positioning shoulders and a downwardly extending twist spike 10, or 10', between the positioning shoulders. The twist spikes 10 and 10' are so arranged that they also serve as connecting terminals by including solder lugs 9 and 9', respectively. The slider block 8, the spindle 2, and the housing 4 are metallic, and therefore conductive, so that the resistor potential which is present at the contact point between the slider arm 7 and the slide track 16 is also present at the soldering lugs 9 and 9' of the resistor.

Between the two vertical end panels 3 and 3' the housing 4 has a horizontal main panel which is shaped in the form of an inverted "U", with the ledges 14 and 14' of the U-shape pointing downwardly, thereby reinforcing the housing and partially covering the slider block 8. In the horizontal main panel is further provided a longitudinal guide slot, formed by two upwardly-flared wall portions 12 and 12'. Between the wall portions 12 and 12' is received a guide finger 13 which extends upwardly from the slider block 8 into the guide slot. A longitudinal center slit 15 in the guide finger 13 divides the finger into two resilient halves, so that a clearance-free engagement between the finger 13 and the wall portions 12 and 12' of the guide slot is obtained. This friction engagement not only improves the accuracy of slider arm positioning, it also prevents any free movement of the arm relative to the slide track 15 as a result of thread clearance, axial spindle clearance, etc. The upwardly-facing flared wall portions 12 and 12' also improve the stiffness of the housing 4.

The retainer clip 6 on the far end of the spindle 2 is so arranged that it cannot rotate with the spindle, being confined against rotation between two ears 5 and 5' which extend rearwardly from the vertical end panel 3'. This arrangement provides a frictional engagement between the retaining clip 6 and the spindle 2, thereby eliminating another source of free movement due to clearance.

It should be understood, of course, that the foregoing disclosure describes only a preferred embodiment of the invention and that it is intended to cover all changes and modifications of this example of the invention which fall within the scope of the appended claims.

We claim:

1. An adjustable resistor element adapted to be mounted as a single element, or as one of a bank of similar elements, on a printed circuit board or the like in such a way that it cooperates with an elongated horizontal resistor slide track in the form of a resistive layer on the circuit board, or an equivalent variable resistance line, by contacting the slide track at a given, movable point along its length, the circuit board being assumed horizontal for purposes of definition used hereinbelow, the resistor element comprising in combination:

a horizontally extending housing of malleable, electrically conductive sheet metal having an elongated center panel and integral vertical end panels at the front and rear ends thereof;

a threaded horizontal spindle journalled in horizontally aligned bores in the vertical end panels of the housing, the spindle including an adjusting knob at its front end outside the forward vertical end panel;

a sliding block threaded for cooperation with the spindle so as to move therealong under spindle rotation, the sliding block carrying a flexible sliding finger having a contact point with the aforementioned slide track, or equivalent, of a printed circuit board;

means for axially retaining the spindle;

means for electrically connecting the sliding finger of the sliding block to the housing;

means defined by the housing for longitudinally guiding the sliding block against rotation; and mounting means for connecting the end panels of the resistor element to the printed circuit board.

2. A resistor element as defined in claim 1, wherein:

the center panel of the housing extends horizontally between the vertical end panels, at a distance above the spindle; and the longitudinal guide means for the sliding block includes a longitudinal guide slot in said center panel and a guide finger extending upwardly from the sliding block so as to be received within the guide slot.

3. A resistor element as defined in claim 2, wherein:

the longitudinal guide slot in the housing center panel has side flanks formed by upwardly flared wall portions of the center panel.

4. A resistor element as defined in claim 2, wherein:

the guide finger of the sliding block has a central vertical slit rendering it yielding in the diameter of contact with the flanks of the guide slot so as to create a clearance-free, frictional engagement therewith.

5. A resistor element as defined in claim 1, wherein:

the resistor mounting means include, on each end panel, a downwardly extending twist spike adapted to be inserted through a corresponding slot in a printed circuit board and to be anchored thereto through twisting of the spike after insertion.

6. A resistor element as defined in claim 5, wherein:

the resistor mounting means further includes, on each end panel, horizontally oriented supporting shoulders flanking the twist spike on both sides thereof, so as to hold the element at a predetermined distance from a printed circuit board, when mounted thereon; and the twist spikes include electric connecting means in the form of soldering lugs.

7. a resistor element as defined in claim 1, wherein:

the spindle retaining means includes a radial groove in the spindle portion outside the rear vertical end panel of the housing, a retaining clip clampingly engaging the spindle groove, and means for holding the retaining clip against rotation, thereby creating a frictional resistance against rotational spindle play.

8. A resistor element as defined in claim 7, wherein:

the retaining clip has a rectangular outline, and the rear vertical end panel of the housing includes two rearwardly extending ears engaging opposite edges of the retaining clip.

* * * * *